(12) United States Patent
Satish et al.

(10) Patent No.: US 8,387,108 B1
(45) Date of Patent: Feb. 26, 2013

(54) CONTROLLING IDENTITY DISCLOSURES

(75) Inventors: Sourabh Satish, Fremont, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 1266 days.

(21) Appl. No.: 11/590,390

(22) Filed: Oct. 31, 2006

(51) Int. Cl.
*H04L 29/06* (2006.01)

(52) U.S. Cl. .......................................... 726/1

(58) Field of Classification Search ............... 726/1, 3, 726/22; 713/176; 709/224
See application file for complete search history.

(56) References Cited

U.S. PATENT DOCUMENTS

| | | | |
|---|---|---|---|
| 6,430,608 B1 * | 8/2002 | Shaio | 709/217 |
| 7,225,460 B2 * | 5/2007 | Barzilai et al. | 726/1 |
| 7,269,853 B1 * | 9/2007 | Dunn | 726/27 |
| 7,710,999 B2 * | 5/2010 | Bolder et al. | 370/465 |
| 7,788,499 B2 * | 8/2010 | Cameron et al. | 713/185 |
| 2005/0102155 A1 * | 5/2005 | Kuehr-McLaren et al. | 705/1 |
| 2007/0143829 A1 * | 6/2007 | Hinton et al. | 726/5 |

OTHER PUBLICATIONS

Michael Arrington, "Verisign's personal identity portal is half way to password bliss," TechCrunch, Aug. 20, 2008, available at http://techcrunch.com/2008/08/20/verisigns-personal-identity-portal-is-half-way-to-password-bliss/.
Dick Hardt, "Identity 2.0", Open source Conference from O'Reilly Media, recorded Aug. 4, 2005, IT Conversation, available at http://itc.conversationsnetwork.org/shows/detail708.html.

* cited by examiner

*Primary Examiner* — Ali Abyaneh
(74) *Attorney, Agent, or Firm* — Wilmer Cutler Pickering Hale and Dorr LLP

(57) ABSTRACT

Controlling identity disclosures is disclosed. A difference between a site policy as received at a first time and the site policy as received at a second time is detected through at least partially automated processing. The existence of the difference is indicated before disclosing to a relying party associated with the site policy, at or subsequent to the second time, an identity information.

19 Claims, 8 Drawing Sheets

ACME IDENTITY PROVIDER

My Account

My Profile

Activity

Help

Authorization Request

The site, http://www.clothing2buynow.com (Clothing2Buy) is prompting for you to verify your identity. Do you want to:

○ Allow once
○ Allow indefintely
○ Allow until [2007] [Dec] [31]
○ Allow until policy changes Which profile would you like to use?

○ Create new profile
○ Use existing profile [[select profile]]

Clothing2Buy is NOT a registered partner or Acme Identity Provider. Which site policy or policies would you like to track? — 252

— 208

— 254

URL: [www.thebloggingplace.com/aup.html]
URL: [ ]
URL: [ ]
URL: [ ]

[Allow] [Deny]

ACME IDENTITY PROVIDER

My Account
My Profile
Activity
Help

Authorization Request

The site, http://www.clothing2buynow.com (Clothing2Buy) is prompting for you to verify your identity. Do you want to:

○ Allow once
○ Allow indefintely
○ Allow until [2007] [Dec] [31]
⦿ Allow until policy changes Which profile would you like to use?

○ Create new profile
⦿ Use existing profile [Commerce]

Policy Advisor — 402

406 {
☑ All
☐ Privacy
☐ Acceptable Use Policy
☐ Return Policy
}

404 — [ No Changes ]

[Allow] [Deny]

ACME IDENTITY PROVIDER

My Account

My Profile

Activity

Help

Authorization Request

The site, http://www.clothing2buynow.com (Clothing2Buy) is prompting for you to verify your identity. Do you want to:

○ Allow once
○ Allow indefintely
○ Allow until  [2007 ▼] [Dec ▼] [31 ▼]
⊙ Allow until policy changes Which profile would you like to use?

⊙ Create new profile
⊙ Use existing profile  [Commerce ▼]

*402*                              Policy Advisor

☑ All
☐ Privacy                 504 ─── STOP!
☐ Acceptable Use Policy        Privacy Policy
☐ Return Policy                Has Been
                               Altered
                      506 ──── Review

[Allow]  [Deny]

ALERT: CHANGES HAVE BEEN MADE TO SITE'S PRIVACY POLICY:

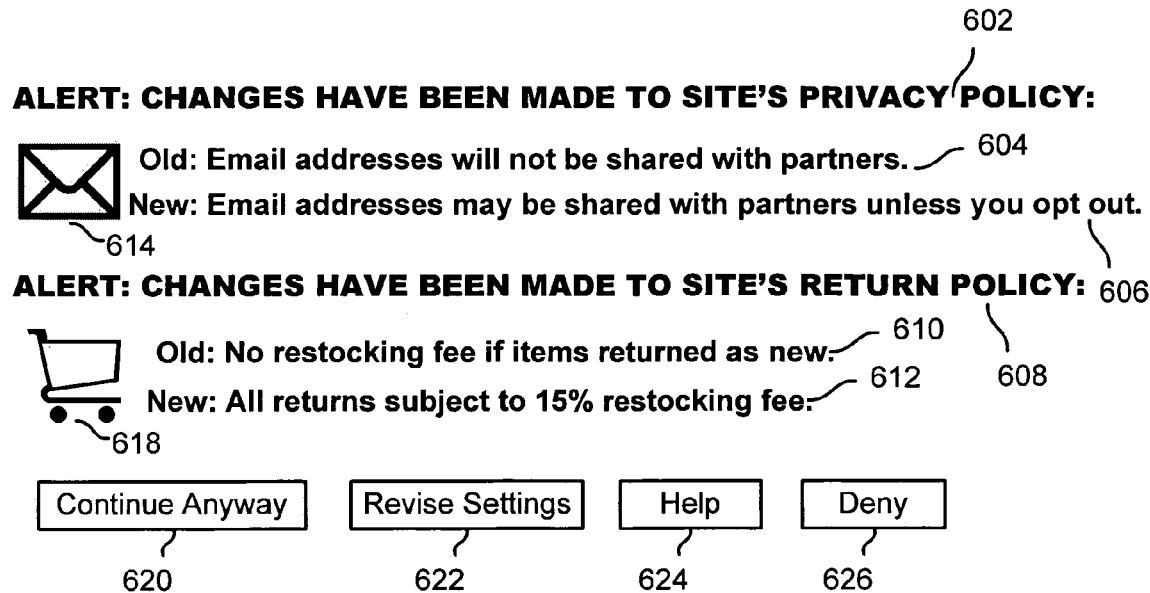

ALERT: CHANGES HAVE BEEN MADE TO SITE'S RETURN POLICY:

FIG. 6A

ALERT: CHANGES HAVE BEEN MADE TO SITE'S PRIVACY POLICY:

We use the information you provide about yourself when placing an order only to complete that order. We ~~do not~~ share this information with outside parties ~~except to the extent necessary to complete that order~~ and may do so without your consent at any time.   654    656

We use return email addresses to answer the email we receive. Such addresses may be ~~are not~~ used for any other purpose by us and ~~are not~~ can be shared with outside parties without your consent at any time.

| Continue Anyway | Revise Settings | Help | Deny |

FIG. 6B

CONTROLLING IDENTITY DISCLOSURES

Visitors to websites are often asked to submit personal and financial information such as addresses, phone numbers, credit card details, etc. (collectively referred to herein as "identity information") as a condition of gaining access to certain areas of the site, site services, etc. This information is typically collected as part of a registration process that often also asks that a user read and agree to site policies and conditions such as privacy policies, acceptable use policies, etc. (referred to herein collectively as "site policies"), some of which may govern the way that the visitors' identity information is used by the site or by third parties. Visitors may base whether and what identity information to provide to sites based in part on such policies.

Unfortunately, site policies frequently contain clauses that permit site owners or operators to modify the site policies without the permission of visitors. In some cases, the policies may specify that visitors need not even be notified when site policies are changed. Sometimes, these practices (e.g., of not notifying visitors of site policy changes) are done by otherwise legitimate entities such as large electronic retailers or popular blogging sites for convenience or at the direction of legal counsel. In other cases the practices are implemented by less scrupulous sites such as ones that intentionally host malicious software/code including spyware, adware, etc. (hereinafter "malware sites"). For example, some malware sites entice visitors to download software by presenting legitimate looking site policies (e.g., stating that the visitor's identity information will not be misused), and then later change the policies in the site's favor (such as by including new clauses that specify that the victim consents to the installation of spyware by continuing to use the site).

Therefore, there is a continuing need to be able to control the release of identity information.

BRIEF DESCRIPTION OF THE DRAWINGS

Various embodiments of the invention are disclosed in the following detailed description and the accompanying drawings.

FIG. 2B illustrates an embodiment of an interface for managing identity information.

FIG. 4 illustrates an embodiment of an interface for managing identity information.

FIG. 5 illustrates an embodiment of an interface for managing identity information.

FIG. 6A illustrates a representation of portions of site policies as rendered in a browser.

FIG. 6B illustrates a representation of a portion of a site policy as rendered in a browser.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
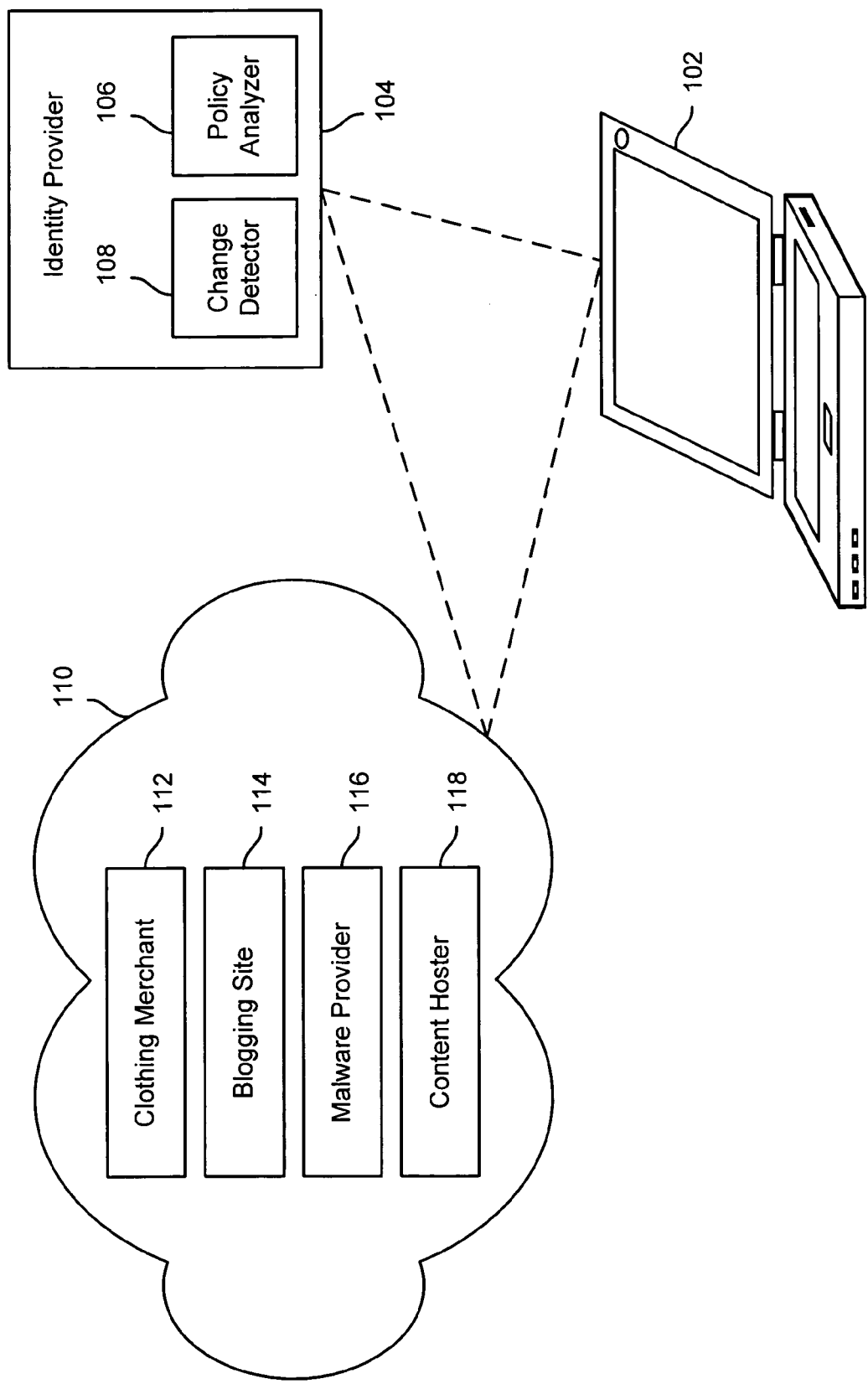
FIG. 1 is a diagram illustrating an embodiment of an environment having identity management.

FIG. 1 is a diagram illustrating an embodiment of an environment having identity management. In some embodiments network 110 includes the Internet or a portion thereof. In some embodiments, network 110 includes a plurality of networks and/or includes one or more intranets.

In the example shown, user 102 communicates (e.g., with a web browser) with various sites in network 110 (also referred to herein as "hosts" 110). In some cases, a site is hosted on a single server. In other cases, such as for load balancing reasons, a site may be replicated or split across multiple servers (or other hardware).

Some of the sites in network 110 request that user 102 authenticate in some manner to that site, such as before granting user 102 access to particular services. Sites that request identity information from users are sometimes referred to herein as "relying parties."

In the example shown, site 112 is an electronic commerce site that offers clothing for sale. Site 114 is a popular blogging site. Site 116 hosts malware which it entices visitors to download under the guise of offering helpful utilities. The sole purpose of site 116 is to collect and ultimately facilitate the misuse of information provided by unsuspecting visitors. Site 118 allows visitors to upload photographs and movies to share with other visitors. In the example shown, sites 112-118 all support the OpenID identity meta-system. Additional sites in network 110 support other identity meta-systems (also referred to herein as "authentication frameworks") such as CardsSpace, Meebo, Sxip, Google TPass, and Verisign Personal Identity Provider (not shown) and the techniques described herein are adapted accordingly.

Suppose user 102 wishes to purchase an article of clothing from site 112. After adding the item to a cart, the user selects a checkout button and is directed to a login/registration page provided by site 112. Included in the page is an option for the user to authenticate by using a third party identity provider such as identity provider 104 which includes support for the OpenID framework. In a typical OpenID transaction, after the user selects to use OpenID, user 102 is redirected to and authenticates to identity provider 104. If this is the first time that user 102 is attempting to authenticate to site 112, the user is prompted to determine which persona (a set of identity information) to provide to the relying party (site 112), and is then redirected back to site 112, this time as an authenticated user. If this is a subsequent attempt to authenticate to site 112 (e.g., because user 102 has previously purchased items from site 112), the user may be presented with the ability to modify existing settings related to authenticating to site 112, and/or may be automatically authenticated to site 112 by identity provider 104.

Identity provider 104 facilitates the authentication of a user to relying parties (such as site 112), permitting the user to manage what identity information is provided to which relying party. As described in more detail below, user 102 may specify to identity provider 104 a variety of different personas for use at different sites. For example, the user may wish to provide user 102's "real" identity (including user 102's real first and last name, primary email address, mailing and billing addresses, and credit card information) to site 112 to complete the transaction of purchasing the clothing articles in his shopping cart.

In other cases, such as when enrolling at a political message board, or a potentially dangerous source of software such as site 116, user 102 might want to provide wholly fictitious information. In other cases, such as when posting to blogging site 114 or content site 118, user 102 may use pseudonymous information, such as a handle such as "Mr. Cool" and an email address hosted by a free email provider, rather than user 102's primary (e.g., work) email address.

As described in more detail below, identity provider 104 includes a variety of modules such as policy analyzer 106 and change detector 108 to help user 102 evaluate the policies of sites 110 and to determine which personas to provide to those sites, e.g., based on changes made to the policies.

In some embodiments, the infrastructure provided by portions of identity provider 104 is located on and/or replicated across a plurality of servers rather than the entirety of identity provider 104 being co-located on a single platform.

Figure 2A:
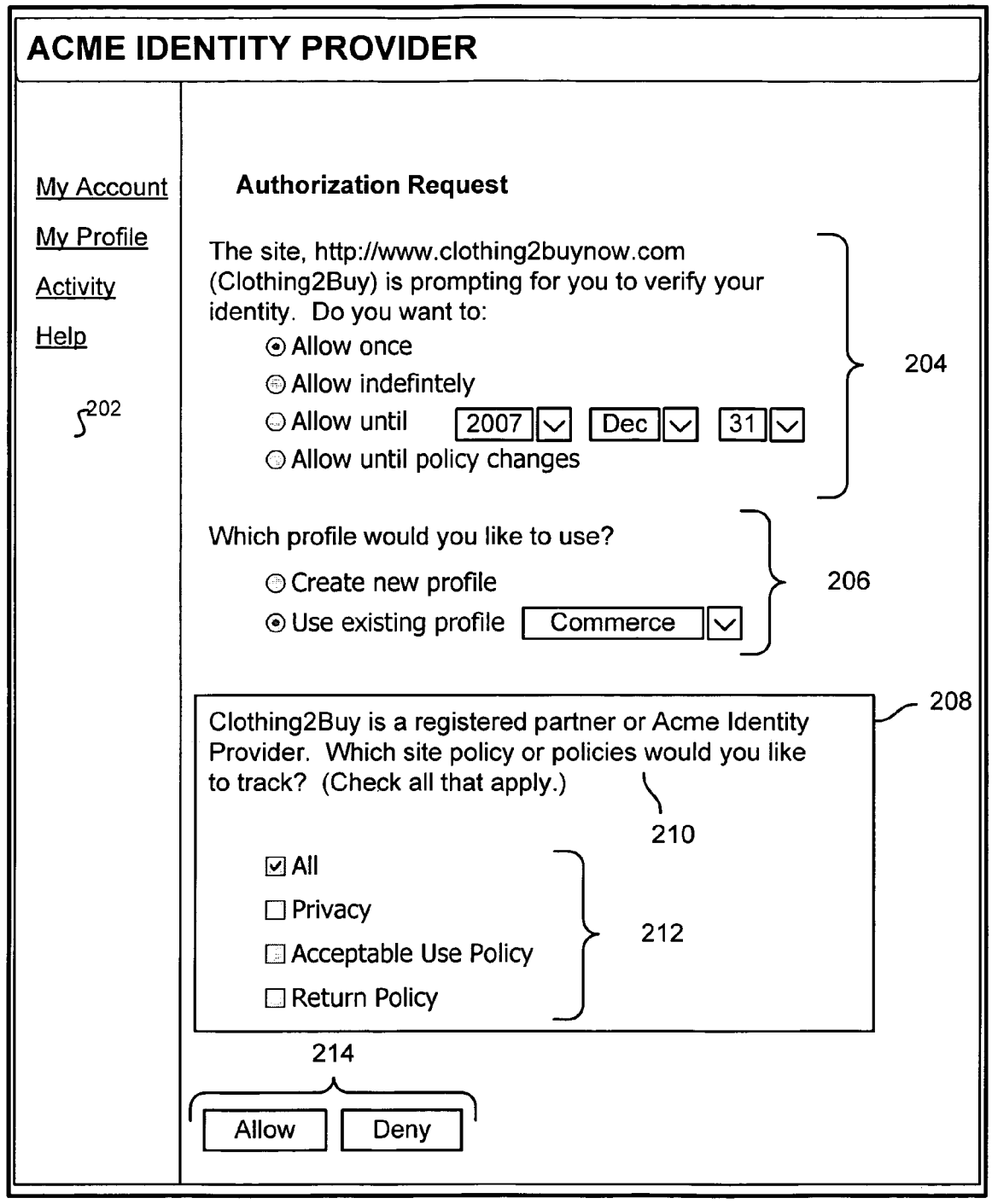
FIG. 2A illustrates an embodiment of an interface for managing identity information.

FIG. 2A illustrates an embodiment of an interface for managing identity information. Suppose that user 102 is visiting (and attempting to purchase items from) site 112 for the first time. When user 102 selects to authenticate to site 112 using OpenID (on the login/registration page of site 112), user 102 is redirected to identity provider 104. After user 102 authenticates to identity provider 104, the user is presented by identity provider 104 with an interface such as interface 200, directing user 102 to provide certain enrollment information relative to site 112.

Region 202 of interface 200 allows user 102 to modify various settings and review information such as previous transactions with identity provider 104. In region 204, user 102 is shown details of the relying party (site 112) to which the user is attempting to authenticate. In the example shown, user 102 is informed of the URL of the relying party (www.clothing2buynow.com) in region 204. In region 206, the user is asked which profile or persona to use with the site, including the options of selecting an existing persona and creating a new persona. As used herein, a persona or profile includes a set of identity information. In region 204, the user is prompted to select a duration for which the profile selected in region 206 is to be used when authenticating to site 112. In the example shown, the options include "allow once" (i.e., give site access to indicated profile information only for the current interaction, and prompt again for user input if the site requests to access information about the user in the future); "allow indefinitely" (i.e., give site access to indicated profile information as often as the site requests, unless or until the user revokes access); "allow until <specified date>" (i.e., allow unlimited access up until the date indicated, but deny access, or request user input, if access is requested after the date indicated); and "allow until policy changes", which as described more fully below enables a user to grant access indefinitely but to have the grant of access revoked, e.g., unless a user indicates continued access is to be allowed, in the event it is determined that an applicable policy of the site has been changed.

Region 208 provides user 102 the ability to determine which site policies of site 112 identity provider 104 should monitor. In the example shown, site 112 cooperates with the policy monitoring services of identity provider 104 (e.g., by being a "registered partner" of the identity provider as indicated in region 210). In this case, site 112 has identified the different types of policies (e.g., privacy policy and acceptable use policy) maintained by site 112. The user is presented in region 212 the option of monitoring for changes in one or more of those policies.

For example, if the user checks the "privacy" box in region 212, user 102 will be alerted by identity provider 104 to any changes made to site 112's privacy policy if such changes should happen in the future. If the user checks the "all" box in region 212, user 102 will be alerted whenever any of the site policies at site 212 change, including when new policies are added by site 212.

The types of options presented in region 212 typically depend on the type of service or services provided by the relying party. For example, because site 112 is an electronic commerce site, it maintains a return policy that governs the return of merchandise to the site by purchasers. A site that hosts content, such as site 118, is unlikely to have such a policy, but may instead have a copyright policy. In the example shown, sites which are partnered with identity provider 104 or otherwise support the site policy monitoring service provided by site 104 specify the types and locations of site policies used by those sites, respectively.

As used herein, a site is said to "cooperate" with the site policy monitoring services of identity provider 104 if the site provides the site policy information in a format (e.g., XML) that can be parsed by identity provider 104 in a uniform fashion. In various embodiments, a machine-readable format (e.g., XML or other) is used to enable automated detection of changes in an applicable policy. In some embodiments, a relying party may use a standards-based manner of expressing a policy, e.g., by using a machine readable format specified by a formal or informal industry standard, and/or a format agreed upon between the relying party and the identity provider. In some embodiments, codes or other machine-readable shorthand are used to indicate a policy and/or component provisions thereof. For example, privacy policy 1A may include a known, for example standards-specified, set of provisions, or email use provision 1A-1 in a privacy policy may indicate email information will be used only to complete user-requested transaction or other interactions, etc. In some embodiments, a hash or other computation based on the policy content is performed, e.g., each time the site requests access to user profile information, to detect that a change has been made to the policy.

A non-cooperative site is not necessarily a malicious one. As described in more detail below, if sites are not partnered with identity provider 104 or do not otherwise support the policy monitoring service provided by site 104 (i.e., a "non-cooperative site"), user 102 can nonetheless be alerted to changes in such sites' policies, but may in some cases receive a different experience than when monitoring the policies of a cooperative site.

Once the user has selected the appropriate options in regions 204, 206, and 212, the user may "submit" the settings by selecting the appropriate box in region 214. If the user decides not to provide any information to site 112 (i.e., does not wish to authenticate to site 112 at this time), the user may instead select the "deny" button in region 214. In the example shown, user 102 has opted to provide identity information to site 112 once (204) and use the profile that user 102 typically uses for electronic commerce transactions (206).

As described in more detail below, if the user has selected one or more policies in region 212, changes made to those policies will be monitored for by identity provider 104. In the example shown, if changes are made to those policies, the user will be notified by identity provider 104 the next time the user attempts to authenticate to site 112.

In some alternative embodiments, the interface 200 and underlying functionality include options for specifying a degree of tolerance to changes in an applicable policy. For example, a user can indicate that the user is indifferent to changes in a product warranty term but wants to be alerted to any change in a return policy. In various embodiments, the applicable policy is expressed in a machine readable format that enables the identity provider to detect not only that the policy has been changed, but also the substantive nature of the change, or at least the provision affected, to enable the identity provider to determine through an automated process whether a change to a policy is one that is of interest or concern to a particular user.

FIG. 2B illustrates an embodiment of an interface for managing identity information. In this example, suppose that user 102 is visiting (and attempting to post comments in) blogging site 114 for the first time. When user 102 selects to authenticate to site 114 using OpenID (on the login/registration page of site 114), user 102 is redirected to identity provider 104. After user 102 authenticates to identity provider 104, the user is presented by identity provider 104 with an interface such as interface 250, directing user 102 to provide certain enrollment information relative to site 114.

Region 208 provides user 102 the ability to determine which site policies of blogging site 114 that identity provider 104 should monitor. In the example shown, site 114 does not cooperate with the policy monitoring services of identity provider 104 (e.g., the blogging site is not a "registered partner" of the identity provider as indicated in region 252). User 102 may nonetheless specify site policies of site 114 that he would like identity provider 104 to monitor by entering the location of those policies in region 254. For example, the user may be concerned about the possibility that changes will be made to the acceptable use policy of site 114 which is located at www.thebloggingplace.com/aup.html. In the example shown, user 102 has entered that URL into the first box shown in region 254 accordingly.

In various embodiments, other methods may be provided to help user 102 specify the policies that he would like monitored for changes. For example, in addition to the URL fields shown in region 254, interface 250 may include the option of specifying a label for each entered URL (such as "AUP" or "privacy policy") in addition to the URL. In some embodiments, the interface 250 includes options for browsing the site 114 to locate pages that correspond to policies desired to be monitored.

Identity provider 104 may also be configured to help the user locate site policies, e.g., through use of policy analyzer 106 that crawls relying parties' sites and looks for keywords such as "terms and conditions" that indicate the presence of a site policy. Identity provider 104 may also aggregate information provided by users about the locations and types of policies used by relying parties. For example, the first time any particular user of identity provider 104 visits a site which is not already a partner of identity provider 104's policy monitoring services, that user may be prompted to "help the community" by locating site policies. When other users of identity provider 104 attempt to register with or authenticate to such as relying party, they may be prompted to review the information provided by the previous user.

In some embodiments, rather than or in addition to providing entry fields such as are shown in region 254, identity provider 104 may be configured to automatically check common locations of the site for policies, such as http://www . . . /legal/ and http://www . . . /policies/. In some embodiments, site 114 may conform to a formal or informal standard or custom by which policies are tagged in a prescribed way to enable them to be located more readily by identity providers or others.

In some embodiments, when a user wishes to monitor the policies of a non-cooperative site, the user may be provided (e.g., as a premium offered by identity provider 104) a service in which an employee associated with identity provider 104 or a third party can be directed to review the site and enter its site policies in a manner that can be evaluated by identity provider 104 (transforming the non-cooperative site into a cooperative site and/or converting a policy from a form that cannot be parsed into a machine readable form) with or without the cooperation of the relying party.

Figure 3:
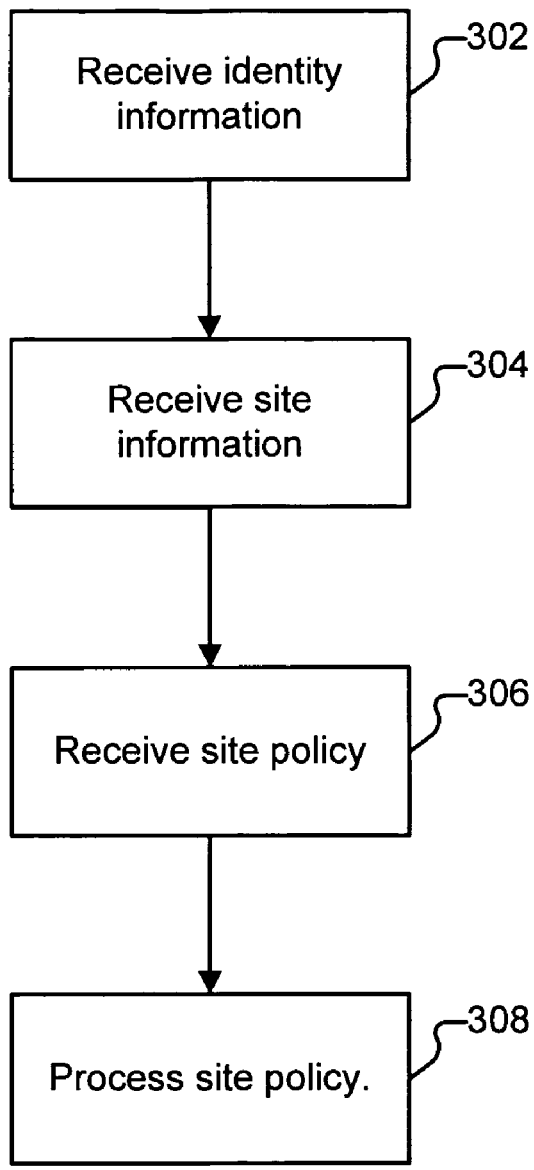
FIG. 3 is a flow chart illustrating an embodiment of a process for associating identity information with a site policy.

FIG. 3 is a flow chart illustrating an embodiment of a process for associating identity information with a site policy. In the example shown, the process is implemented by identity provider 104. The process is used in some embodiments concurrently with a user authenticating to a site for the first time (e.g., when the user first registers with the relying party).

The process begins at 302 when identity information is received. In the example shown in FIG. 2A, the identity information received at 302 includes the profile selected or created in region 206.

At 304 site information is received. In the example shown in FIG. 2A, site information is received when the user is redirected to interface 200 by the site, such as via HTTP referrer information.

At 306, one or more site policies are received. In the example shown in FIG. 2A, which policies are received at 306 are determined by indications made by a user, such as in region 212. In some embodiments, all known site policies for the site are received at 306 irrespective of user choice, or the user is not prompted to select particular polices and all policies are received automatically. In the example shown in FIG. 2B, which policies are received at 306 are determined by the URLs specified by the user in region 254. Site policies may be received directly from the site to which the policies pertain. As described in more detail below, policies may also be received from a third party, such as a third party service that evaluates the legal meanings of such policies, digitally signs such policies, etc.

At 308, the policies received at 306 are processed. In some embodiments, the processing performed at 308 may be simple, such as storing the policy, and/or performing a hash or digitally signing the policy. More complex processing may also be performed at 308. For example, if the site policy is in a standardized or otherwise machine readable representation (e.g., using XML tags), different clauses or portions of the policy may be extracted and stored, may be presented to the user for additional review, may be provided to the user with annotations, etc.

FIG. 4 illustrates an embodiment of an interface for managing identity information. Suppose user 102 successfully established an account with site 112 and completed a purchase. A few days later, the user would like to make another purchase at site 112. The user visits site 112, again adds items to his shopping cart and selects to check out, and is directed to the login/register page of site 112. The user opts to log in using identity provider 104's authentication service and is redirected to identity provider 104. After authenticating to identity provider 104, user 102 is presented with interface 400.

Region 402 advises user 102 as to the status of the site policies of site 112 and allows the user to modify settings related to the monitoring of site 112's policies. For example, region 404 indicates that since user 102's last visit, no changes have been made to any of site 112's policies. In the example shown, region 404 is rendered in a soothing color, such as green, to help the user immediately identify that the site policies are safely unchanged. Other indications may also be used, such as region 402 rendering differently based on whether a policy has been altered, different sounds may be played based on status, and/or a combination of elements/alerts may be used.

The user can change settings, such as which policies should be monitored by making the appropriate selection in region 406. In the example shown in FIG. 2A, user 102 opted to provide identity information to site 112 once. In such circumstances, each time user 102 attempts to authenticate to site 112, user 102 will be redirected to interface 400 and required to select the "Allow" button before being authenticated. Because the user has had a favorable transaction with site 112, in the example shown in FIG. 4, user 112 had chosen to change the authorization to "allow until policy changes." In future dealings with site 112, user 102 will be automatically authenticated to site 112 without being required to select the Allow button unless and until the site policies of site 112 change. As such, user 112 will not be presented with interface 400 unless a change in the policy is detected, as described in more detail below.

In various embodiments, other information may be provided to user 102 in region 402 in addition to or instead of the information shown. For example, region 402 may offer links to the existing policies, or to annotated or otherwise enhanced versions of the policies for the user to review. The user may also have the ability to look at all previous versions of the policies as collected by identity provider 104, including before user 102 began using the services of identity provider 104. In some embodiments, information about all site policies is presented in region 402, irrespective of whether or not the user has checked the policy in region 406. Such may be the case, for example, to keep the user informed about the site without triggering any particular rules that the user may have specified, as described in more detail below.

If policies are added or deleted from the monitored site, region 402 may also include notices that alert the user to this information and provide the user the opportunity to subscribe to the monitoring of any such new policies. For example, suppose site 112 is updated to include a rating system that allows shoppers to rate products. Site 112 might institute a copyright policy (that it did not previously have) that governs what content may be included in user reviews. In such a case, region 402 would alert a user to the policy created since the user last visited site 112 and allow the user to monitor the copyright policy for changes.

FIG. 5 illustrates an embodiment of an interface for managing identity information. Suppose user 102 has successfully completed a second purchase with site 112 and a few months later chooses to make a third purchase. The user visits site 112, again adds items to his shopping cart, and is directed to visit the login/register page of site 112 upon selecting a checkout option. The user opts to log in using identity provider 104's authentication service and is redirected to identity provider 104. After authenticating to identity provider 104, user 102 is presented with interface 400.

In this example, region 504 indicates that since user 102's last visit, site 112 has changed its privacy policy. The user can review the changes made by selecting region 506 of interface 400. User 102 may also be alerted to the change by identity provider 104 in a variety of other ways. For example, in addition to or instead of the shape shown in region 504 (a red stop sign), the entire page background may change, a sound may play, or other elements/alerts may be employed, such as a popup. In some embodiments, other notifications may also be used such as sending the user a text message or email containing the information associated with the policy change.

FIG. 6A illustrates a representation of portions of site policies as rendered in a browser. In the example shown, a user such as user 102 has been alerted that changes have been made to two site policies of a site, e.g. via an interface such as interface 400, and the user has chosen to review the changes, such as by selecting region 506 of FIG. 5.

In the example shown in FIG. 6A, changes have been made to a site whose policies are stored with identity provider 104 in a machine readable format. As such, the changes made are summarized for the user through use of icons and without the need to provide the actual text of the changes to the user (unless the user desires to see the full text of the changes, a configurable option in some embodiments). Region 602 indicates that a change has been made to the site's privacy policy and icon 614 indicates that the change made affects the treatment of email addresses. Region 604 provides a summary of the old policy (what the user previously agreed to be bound by, e.g., at the time of registration) and region 606 provides a summary of what the new policy is.

Similarly, region 608 indicates that a change has been made to the site's return policy and icon 618 indicates that the change made affects fees. Region 610 provides a summary of the old policy and region 612 provides a summary of what the new policy is.

The user is also presented with several ways of responding to the changes. The user may choose to continue dealing with the site (effectively agreeing to be bound by the new terms) by selecting region 620. If the user selects region 622, he will be taken to an interface that allows him to modify the settings associated with authenticating to the site. For example, if the user selects region 622, the user may be presented with an interface that includes regions 204 and 206 so that the user may select a different profile to use with the site, and/or to specify how long the verification is authorized. The user may also select region 626, preventing the authentication (and thus the transmission of identity information) to the site whose policies have changed.

In the example shown, if the user selects region 624, the user is provided advice/recommendations on how to determine which of the other three options to select. In some embodiments, selecting region 624 connects the user to a live operator associated with identity provider 104 (or a third party) that can help explain the changes to the user. The user may also be connected with a representative of the site, e.g., in the case where the site is a partner of identity provider 104.

FIG. 6B illustrates a representation of a portion of a site policy as rendered in a browser. In the example shown, a user such as user 102 has been alerted that changes have been made to the site policy of a site, e.g. via an interface such as interface 400, and the user has chosen to review the changes, such as by selecting region 506 of FIG. 5.

In the example shown in FIG. 6B, changes have been made to a non-cooperative site. Rather than summarizing the changes as in FIG. 6A, the actual changes to the text are presented to the user. Insertions are represented by underlined text (656) and deletions are represented by strikethrough text (654). In various embodiments, other techniques may be used to alert the user of changes to site policies, including the use of colors, sounds, and images. Which policy has been altered may be indicated in region 652 if, e.g., the title of the policy is known, such as via crawling or via the tagging of the policy by the user. If such information is not available, region 652 may be omitted or may provide more generic information such as that "a policy" has been changed.

Figure 7:
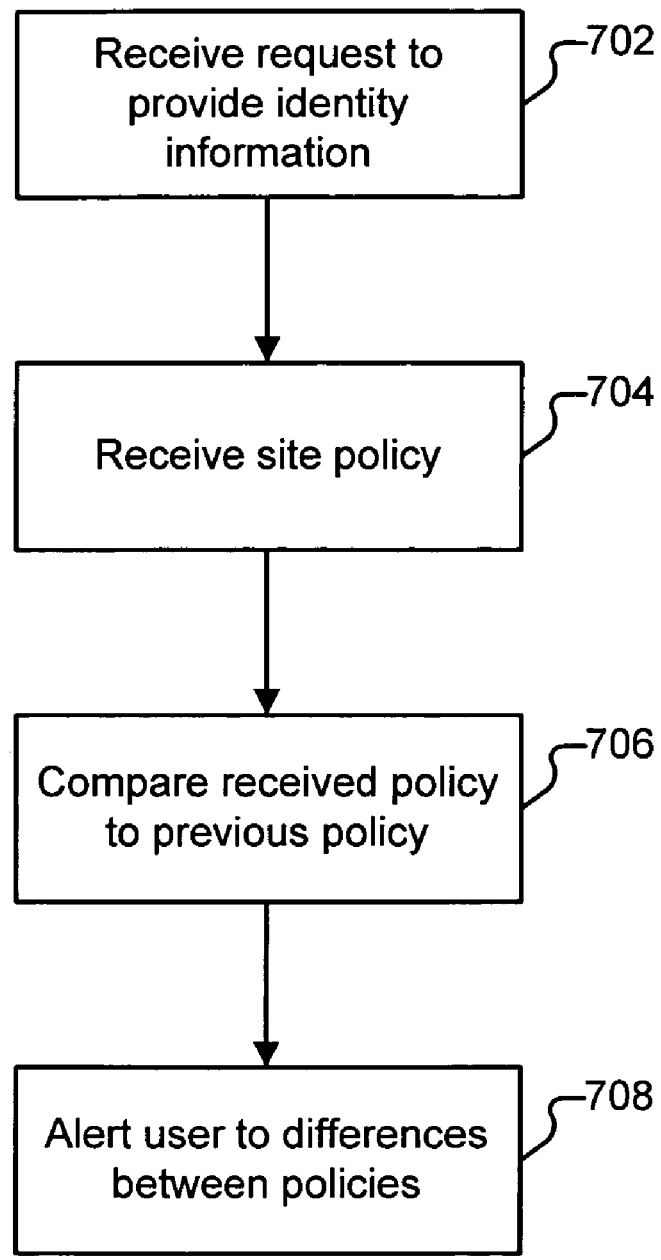
FIG. 7 is a flow chart illustrating an embodiment of a process for detecting a difference in a site policy.

FIG. 7 is a flow chart illustrating an embodiment of a process for detecting a difference in a site policy. In the example shown, the process is implemented by identity provider 104. The process is used in some embodiments when a user desires to authenticate to a site with which the user has an established account.

The process begins at 702 when a request to provide identity information is received. In the scenario described herein, a request is received at 702 when a user is directed to identity provider 104 by a site such as site 112. The request may be received at other times and by other techniques, e.g. depending on the framework(s) supported by the site and/or identity provider.

At 704, one or more site policies are received. In the example shown in FIG. 2A, which policies are received at 704 are determined by indications made by a user, such as in region 212. In some embodiments, all known site policies for the site are received at 704 irrespective of user choice, or the user is not prompted to select particular polices and all policies are received automatically. In the example shown in FIG. 2B, which policies are received at 704 are determined by the URLs specified by the user in region 254. Site policies may be received directly from the site to which the policies pertain. Policies may also be received from a third party, such as a third party service that evaluates the legal meanings of such policies, digitally signs such policies, etc.

At 706, the received policy is compared to a previously received policy, such as by change detector 108. For example, in some embodiments at 706 the received policy is compared to the policy received at 306 of FIG. 3. A variety of techniques may be used to compare the policies. For example, if the policies received are in a plain text format, a diff may be taken. The policies may also be hashed and the results compared.

In some embodiments, the policies are digitally signed, such as with the relying party's private key. The policies may also be signed by a third party, such as by a consumer protection group or business ethics or privacy association.

If a difference between the policies is detected at 706, a user may be alerted to the existence of a difference. What type of alert is provided and for which types of changes may be configured by the user and/or based on a variety of factors. For example, tolerances for immaterial changes (such as changes in font types or colors) may be included in the determination made at 706 so that users are not unnecessarily alerted to changes. Similarly, users in some embodiments may configure types of changes with which they are unconcerned (e.g., increases in shipping rates, as may be recognized in policies received in or converted into a machine readable format).

As previously described, one example of a change is the addition or deletion of an entire policy. In such a case, one of the two sets of policies received might be null. If a user decides to continue authenticating to the site despite the change (e.g., by selecting region 620 of the interface shown in FIG. 6A), in some embodiments the policy received at 704 is stored for use in a future comparison.

In some embodiments, in addition to or instead of alerting a user at 708, other actions may be taken. For example, a user may configure identity provider 104 with certain rules that govern which identity information is provided to a relying party. In the event that a change is detected, identity provider 104 may be instructed to cease providing one profile (e.g., "real identity") to a relying party and begin providing a different profile (e.g., "pseudonymous identity").

In various embodiments, changes detected at 706 may be shared with other users of identity provider 104. For example, if identity provider 104 has thousands of subscribers that all make use of site 112, the first time a change is detected in site 112's policies (e.g., by user 102), a notification may be preemptively provided by identity provider 104 to all of the other users, without those users having to attempt to access site 112 themselves.

Although certain of the embodiments described above include the use of an identity provider, in various embodiments the site policy monitoring functionality described above as being provided by identity provider 104 (e.g., through the policy analyzer 106 and change detector 108 modules) is provided by an agent, application, or other process or device in addition to or instead of identity provider 104. For example, in some embodiments site policy monitoring is performed at least in part by an agent working in conjunction with a user's browser to capture and analyze site policies as the user browses sites or otherwise interacts with them. The user is alerted to detected changes and, e.g., warned not to enter in a username and password at the site. In some embodiments, using a client-based agent to perform site policy monitoring enables such monitoring to be performed with respect to websites that do not support the authentication frameworks described above, such as OpenID.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for controlling identity disclosures comprising:
    receiving a request to provide identity information of a user to a site;
    receiving a current site policy associated with the site, wherein receiving the current site policy comprises at least one of retrieving the current site policy from a user specified location and retrieving the current site policy from a specified site policy location of the site;
    detecting, via at least one computer processor, a difference between the current site policy and a previous site policy associated with the site, wherein the difference is detected based at least in part on information received from a third party;
    indicating an existence of the difference before providing the user identity information to the site;
    providing to the user an interface for specifying which one or more of a plurality of policy types to track; and
    receiving from the user a specification of which one or more of a plurality of policy types to track, wherein the policies are of a type specified by the user for tracking.

2. The method of claim 1 wherein either the current site policy or the previous site policy is null and the difference is the addition or deletion of the site policy, respectively.

3. The method of claim 1 wherein the site policy includes a privacy policy.

4. The method of claim 1 wherein the site policy includes a term of service.

5. The method of claim 1 wherein detecting a difference includes performing a hash of the current site policy and the previous site policy.

6. The method of claim 1 wherein detecting a difference includes performing a diff of the current site policy and the previous site policy.

7. The method of claim 1 wherein detecting a difference includes evaluating a digital signature.

8. The method of claim 1 wherein the existence of the difference is indicated to the user.

9. The method of claim 1 wherein the user is a first user and wherein the existence of the difference is indicated to a second user.

10. The method of claim 1 wherein the indication includes a textual representation of the difference.

11. The method of claim 1 wherein the indication includes a graphical representation of the difference.

12. The method of claim 1 wherein the indication of the difference includes a change in color.

13. The method of claim 1 wherein the third party digitally signs one or more of the site policies.

14. The method of claim 1 wherein the site policy is received from a site that makes use of at least one authentication frameworks.

15. A system for controlling identity disclosures, including:
 a processor; and
 a memory coupled with the processor, wherein the memory is configured to provide the processor with instructions which when executed cause the processor to:
 receive a request to provide identity information of a user to a site;
 receive a current site policy associated with the site, wherein receiving the current site policy comprises at least one of retrieving the current site policy from a user specified location and retrieving the current site policy from a specified site policy location of the site;
 detect a difference between the current site policy and a previous site policy associated with the site, wherein the difference is detected based at least in part on information received from a third party;
 indicate an existence of the difference before providing the user identity information;
 provide to the user an interface for specifying which one or more of a plurality of policy types to track; and
 receive from the user a specification of which one or more of a plurality of policy types to track, wherein the policies are of a type specified by the user for tracking.

16. The system of claim 15 wherein the instructions cause the processor to detect the difference at least in part by performing a hash of the current site policy and the previous site policy.

17. The system of claim 15 wherein the existence of the difference is indicated to the user.

18. The system of claim 15 wherein the indication includes a representation of the difference.

19. An article of manufacture for controlling identity disclosures, the article of manufacture comprising:
 at least one non-transitory processor readable storage medium; and
 instructions stored on the at least one non-transitory processor readable storage medium;
 wherein the instructions are readable from the at least one non-transitory processor readable storage medium by at least one processor and thereby cause the at least one processor to operate to:
 receive a request to provide identity information of a user to a site;
 receive a current site policy associated with the site, wherein receiving the current site policy comprises at least one of retrieving the current site policy from a user specified location and retrieving the current site policy from a specified site policy location of the site;
 detect a difference between the current site policy and a previous site policy associated with the site, wherein the difference is detected based at least in part on information received from a third party;
 indicate an existence of the difference before providing the user identity information to the site;
 provide to the user an interface for specifying which one or more of a plurality of policy types to track; and
 receive from the user a specification of which one or more of a plurality of policy types to track, wherein the policies are of a type specified by the user for tracking.

* * * * *